United States Patent [19]
Reid et al.

[11] Patent Number: 4,708,242
[45] Date of Patent: Nov. 24, 1987

[54] PROCESS AND APPARATUS FOR COVERING ARTICLES WITH FILM

[76] Inventors: Philip L. Reid, Rte. 2, Box 422, Duncan, S.C. 29334; Thomas S. Lofton, Jr., 734 Cherokee Rd., Charlotte, N.C. 28207

[21] Appl. No.: 10,292

[22] Filed: Jan. 21, 1987

Related U.S. Application Data

[63] Continuation of Ser. No. 677,188, Dec. 3, 1984, Pat. No. 4,658,568.

[51] Int. Cl.⁴ .......................... B67B 5/03; B67B 3/04
[52] U.S. Cl. .................................. 206/257; 215/251; 215/326; 53/410
[58] Field of Search ............... 206/497, 434, 427, 429; 220/256, 257; 215/236, 317, 326, 246, 251; 53/293, 464, 329, 397, 398, 410, 441, 478, 485, 487, 488, 556

[56] References Cited

U.S. PATENT DOCUMENTS

| | | | |
|---|---|---|---|
| 2,210,509 | 8/1940 | Strauch | 53/464 |
| 2,720,309 | 10/1955 | Kimball | 53/464 X |
| 2,976,655 | 3/1961 | Dreyfus et al. | 53/329 X |
| 2,984,058 | 5/1961 | Meissner | 53/487 |
| 3,494,098 | 2/1970 | Sternau | 53/329 |
| 3,849,972 | 11/1974 | Pepmeier et al. | 53/329 |
| 3,851,440 | 12/1974 | Horsky | 53/441 X |
| 3,967,433 | 7/1976 | Bonfiglioli | 53/464 X |
| 4,196,820 | 4/1980 | Lipowski et al. | 215/326 X |
| 4,199,917 | 4/1980 | Mitchell | 53/441 |
| 4,520,613 | 6/1985 | Claudio | 53/441 |

FOREIGN PATENT DOCUMENTS

| | | | |
|---|---|---|---|
| 240362 | 2/1961 | Australia | 53/487 |
| 1034821 | 7/1966 | United Kingdom | 53/329 |

*Primary Examiner*—Horace M. Culver
*Attorney, Agent, or Firm*—Bailey & Hardaway

[57] ABSTRACT

A novel packaged product as provided by process of contacting an article with a covering film and stretching the film until the film is severed from itself and thus clings to the surfaces of the articles. An apparatus is provided for carrying out the process.

1 Claim, 7 Drawing Figures

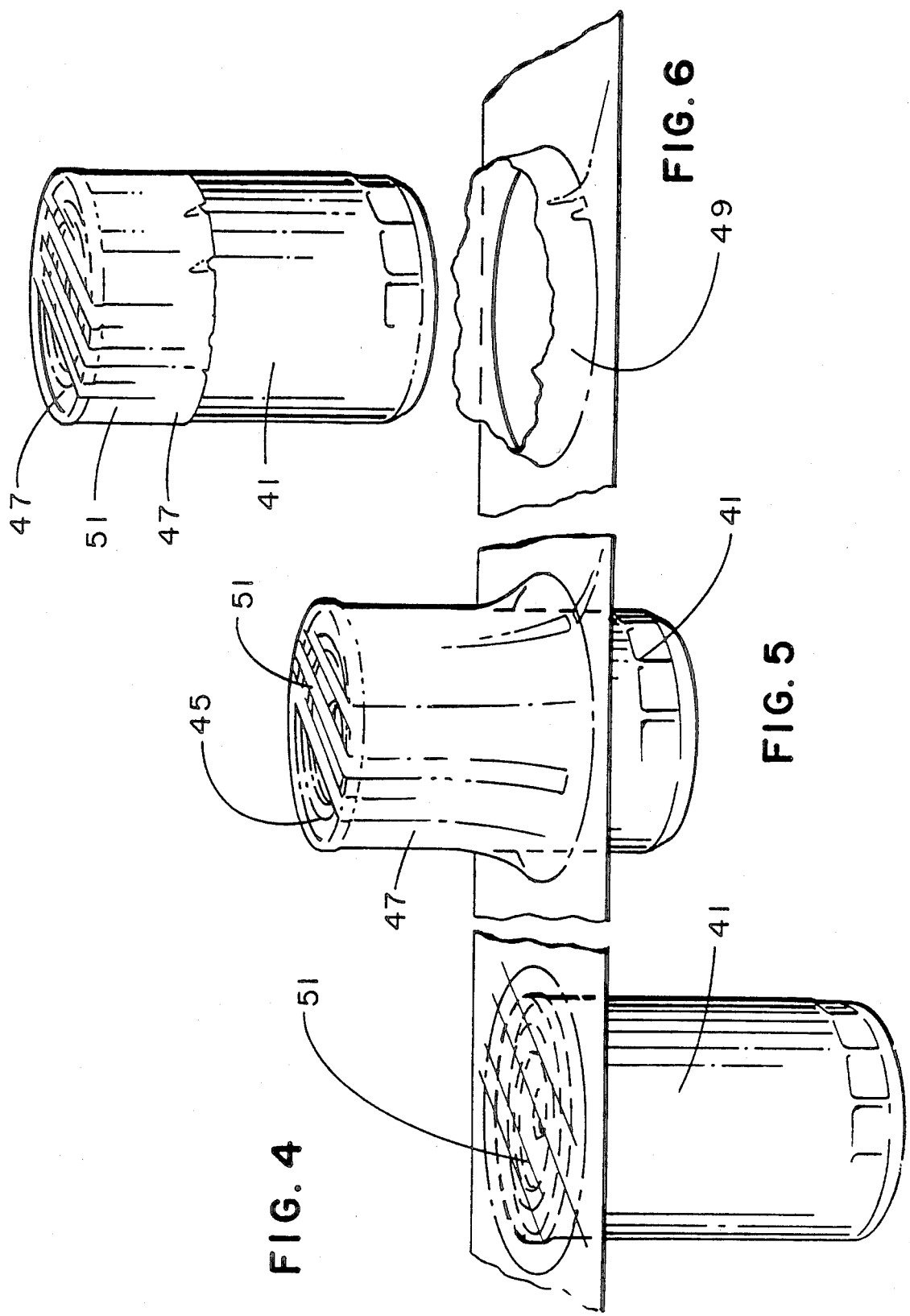

PROCESS AND APPARATUS FOR COVERING ARTICLES WITH FILM

This application is a continuation of application Ser. No. 06/677,188, filed 12/3/84 and now U.S. Pat. No. 4,658,568.

BACKGROUND OF THE INVENTION

This invention relates generally to the art of packaging and more particularly to a process and apparatus for partially covering an article with polymeric film material.

Various apparatus and processes have been developed in the packaging art for the purpose of covering an article of manufacture with film material. A highly successful type of packaging process has utilized a heat shrinkable film material for covering articles such that the shrinking of the material causes tight conformance with the contours of the article about which the film has been placed. An example of this is described in U.S. Pat. No. 3,133,387 to J. W. Harrison.

Another type of heat shrink operation is described in U. S. Pat. Nos. 3,352,086 and 2,036,105.

Various other processes have utilized the heat sealing characteristics of various thermoplastic materials for utilization in packaging. Such processes can be combined with heat shrinkability in order to form a tight fitting package.

Various disadvantages, however, exist when processes must incorporate the application of heat to achieve a desired package.

SUMMARY OF THE INVENTION

It is thus an object of this invention to provide a unique packaging process.

It is a further object of this invention to provide such a process which does not require heat shrinking or heat sealing.

It is a still further and more particular object of this invention to provide such a process for the covering of the circular face of cylindrical objects.

It is a still further object of this invention to provide an apparatus for carrying out such a process.

It is a yet further object of this invention to provide a uniquely packaged article brought about by such process.

These as well as other objects are brought about by a process wherein an article is contacted with a film material about a primary surface thereof and the film is retained circumferentially while being moved about a secondary surface of the article until the film is stretched to the point of severance thus causing the film to cling tightly to the secondary surface of the article. A novel packaged article is produced by the process and means are provided for carrying out such process.

BRIEF DESCRIPTION OF THE DRAWINGS

FIGS. 4, 5 and 6 schematically illustrate the relationship between film and articles produced by the process of this invention.

DETAILED DESCRIPTION

In accordance with this invention it has been found that objects may be partially covered with polymeric packaging film by a process not heretofore utilized within the prior art. The process of this invention produces a covered product with unique characteristics while possessing significant advantages over processes heretofore utilized. Various other advantages will become apparent from the following description given with reference to the various figures of drawing.

Figure 1:
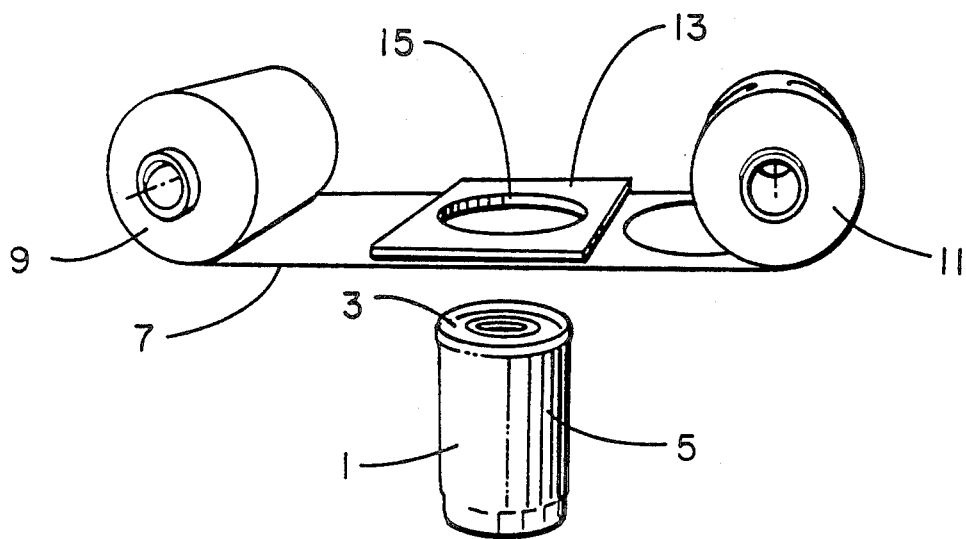
FIGS. 1 and 2 of the drawings schematically illustrate the process of this invention.
Figure 2:
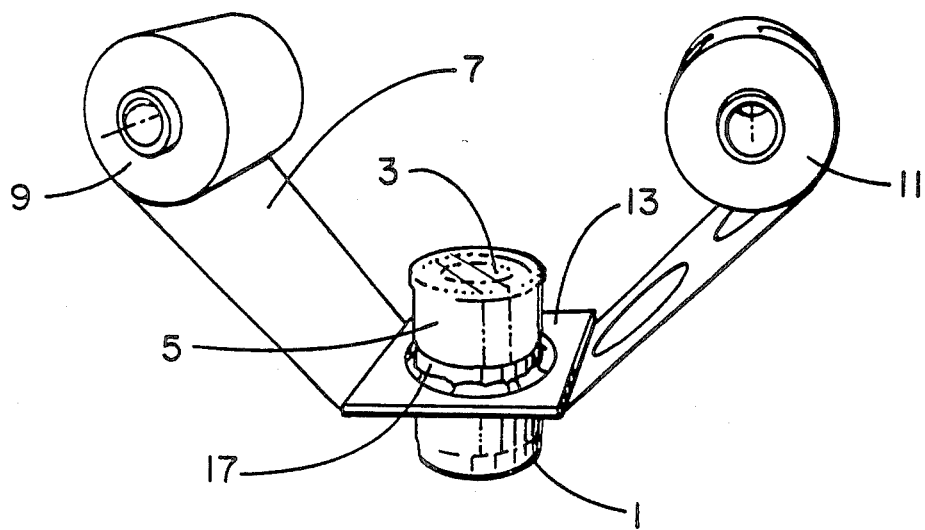

The process of this invention may be best illustrated by referring to FIGS. 1 and 2 of the drawings. Illustrated in FIG. 1 of the drawings is an article 1 about which it is desired to place a covering. The covering is placed across primary surface 3 and a secondary surface 5. As illustrated in FIG. 1 the article is of cylindrical shape with the primary surface 3 being the circular face of a cylinder and secondary surface 5 being the cylindrical wall. A source of polymeric film 7 is illustrated as being supplied by roll 9 and recovered by roll 11.

The process is carried out by relatively removing the film 7 and the article 1 toward one another.

For this purpose illustrated in FIG. 1 is a thin plate 13 defining an orifice 15 which conforms in configuration to the primary surface 3 of the article which is to be covered. The thin plate 13, together with rolls 9 and 11, restrain the film during the relative movement of the thin plate 13 and article 1. FIG. 2 of the drawings illustrates the partially covered object 17 after relative movement between plate 13 and article 1 is completed. It is seen that film 7 contacts the primary surface 3 and is then stretched along the side of secondary surface 5 until the film 7 exceeds its shear strength and is severed about the sides. Film 7 is both plastically and elastically deformed during the relative movement such that upon severance there is sufficient elasticity remaining within the film 7 to cling to the sides of the primary surface 5 while providing a complete covering of the primary surface 3. The severance which occurs as a result of the process of this invention can be assisted with the aid of a cutting edge or hot wire if severance at a precise location is desired. The article 1 may be rotated while thin plate 13 is positioned about the article 1 during the step of relative movement.

The process of this invention is simple and efficient, requiring neither heat shrinkage steps nor heat sealing steps to provide an effective covering for an article 1.

The thus wrapped article 17 is unique in its characteristics in that the covering is formed without heat shrinkage or enveloping the entire article. The article is thus covered with a single movement brought about by the simultaneous steps of contacting the article with a film material, relatively moving the film material and the article while circumfrentially restraining the film as it moves across the primary surface 3 and in the general direction of secondary surface 5. While the process is preferred for utilization on cylindrically shaped objects it is understood however that non-cylindrically shaped objects may be covered utilizing the process of this invention with the orifice 15 conforming to the shape of the primary surface of the article or articles to be covered. Non-cylindrical shapes however do not have the uniformity of film distribution and cling that is exhibited with cylindrical objects however. Additionally, multiples of articles may be covered using the process of this invention. Such multiples would exhibit the same lack of uniformity exhibited by non-cylindrical object.

Figure 3:
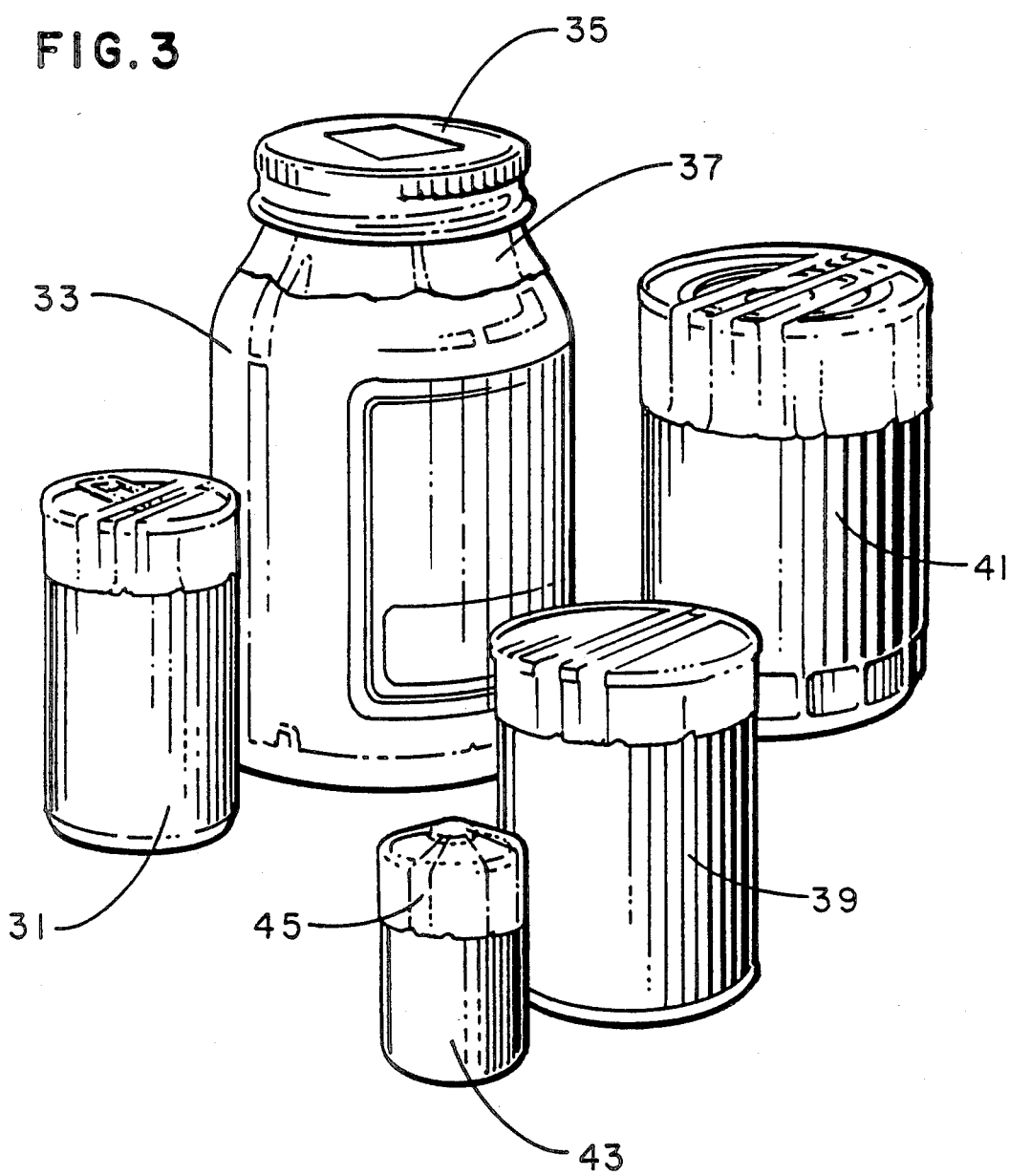
FIG. 3 of the drawings illustrates various articles produced in accordance with this invention.

FIG. 3 of the drawings illustrates various cylindrical objects which may be partially covered utilizing the process of this invention. As illustrated in FIG. 3, conventional beverage containers 31 may be covered so as to provide sanitation and protection for the primary pouring surface of the beverage container.

Additionally, conventional food containers such as 33 may be covered beneath or over conventional cap closures 35 as a technique to tamper-proof such containers. It is understood that any tampering would necessarily dislodge the covering film 37 thereon. Additional examples are illustrated at 39 wherein canned food items retain their original sanitation while being protected from contamination throughout the food distribution process.

A preferred application for the process of this invention in producing uniquely packaged articles is the covering the open end of oil filters such as 41. Such process provides a unique attractive and protective covering for oil filters while not requiring the burdensome enveloping and heat shrinkage steps heretofore utilized.

Conventional storage batteries 43 also may be protected from potential corrosion and contamination utilizing a film covering 45 in accordance with this invention. Various other articles, however, lend themselves to utilization with the process of this invention. The process of this invention lends itself to the retention of secondary items with covered articles. For example, fliers, directions, coupons, et cetera, may be retained beneath the covering as the article proceeds through the distribution chain.

Various apparatuses may be utilized in carrying out the process of this invention. However, for purposes of simplicity the process of this invention is progressively illustrated in FIGS. 4, 5 and 6. In FIG. 4 the primary surface of article 41 is contacted with film 51. In FIG. 5 article 41 is shown with film 51 stretched from the primary surface 45 along secondary surface 47. FIG. 6 illustrates the finally packaged product 41 having the stretched film 51 covering the primary surface 45 and stretched and clinging to the secondary surface 47. The remaining film is illustrated at 49 after severance has occurred.

Figure 7:
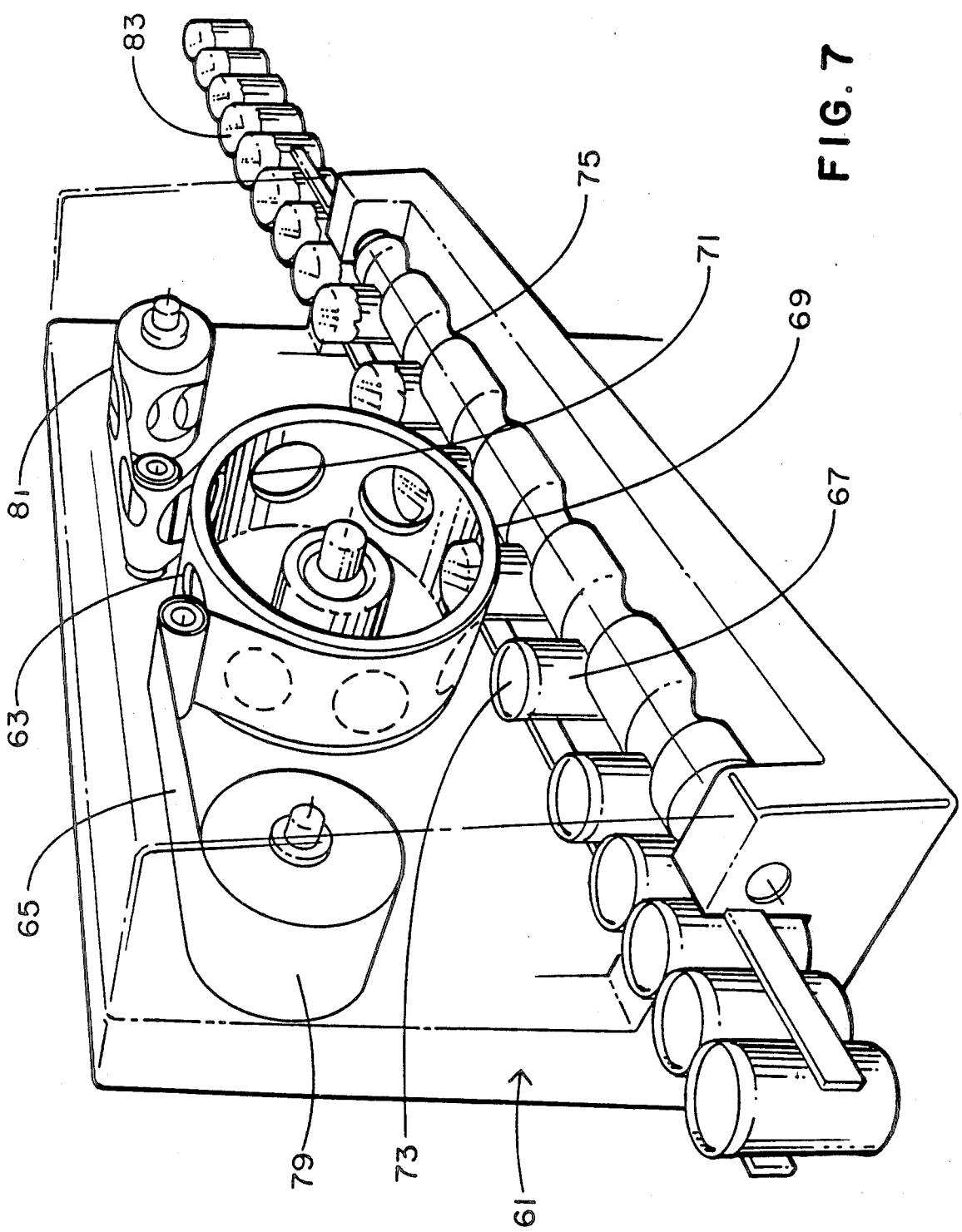
FIG. 7 of the drawings is a perspective illustration of an apparatus in accordance with this invention.

FIG. 7 of the drawings illustrates an apparatus for carrying out the process of this invention. The apparatus 61 thus comprises means 63 for relatively moving film 65 toward an article 67 to be covered with such film. The means for movement is illustrated as a drum roll 69 defining conforming thin plates 71 which circumferentially move about the primary surface 73 of the individual articles 67. The articles 67 herein are illustrated as being cylindrically shaped objects which are timed by screw 75 so as to conform to the movement of drum 69. Drum 69 with thin plate 71 define means for restraining the film as it is moved in a substantially parallel relationship to the secondary surface of article 67. A supply of film 65 is provided by means 79 while scrap material is gathered by means 81. Apparatus 61 thus carries out the process of this invention and provides articles 83 partially covered in accordance with this invention.

The process of this invention is highly dependent upon the utilization of appropriate polymeric film material for use. It is required that the film material utilized in this invention possess both elastic and plastic deformation such that the film is capable of being plastically deformed about the secondary surface but while having sufficient elasticity to cling after the shear strength of the film is exceeded. It has been found that a linear low density polyethelene is a preferred film for utilization with this invention. Such preferred film for utilization with this invention. Such material is readily available and conventionally utilized in pallet wrapping processes. However, other materials may be utilized such as polypropylene, co-polymers of ethylene and vinyl acetate. It is preferred, however, to utilize polymers which have not been cross-linked since such polymers do not possess sufficient elastic or plastic deformation to provide the clinging characteristics which is preferred with this invention.

The thickness of film utilized in the process of this invention will, of course, vary with the application and size of article being covered. For example, on conventional grocery store items, films of less than 2 mils and preferably 1 mil thickness are utilized. However, if 50-gallon drums were being covered in accordance with this invention it is contemplated that film of 10 mil thickness be utilized.

It is seen that the process of this invention provides uniquely partially covered article and does so without the requirement for a heating step as has been conventionally utilized. The invention also comprises an apparatus for carrying out such process which is novel with simplicity greatly exceeding that of prior art covering apparatus. As many variations will become apparent to those from a reading of the above description, such variations are embodied within the spirit and scope of this invention as defined by the following appended claims.

That which is claimed is:

1. A partially covered article produced by the process of:
   contacting an article to be covered with a covering film, said article having a primary surface contacted by said film and a secondary surface merging with said primary surface and being generally perpendicular thereto:
   moving a portion of said film and said article relative to one another toward one another in the direction of said secondary surface;
   circumferentially restraining said film in a circumference about said secondary surface whereby said film portion is positioned across said primary surface and subsequently stretched in the direction of said secondary surface due to said steps of moving and restraining; and
   severing said film portion from said film by continuing said steps of moving and restraining until said film portion is severed from adjacent film, said severed film then clinging to said secondary surface due to the stretching thereof.

* * * * *